(12) United States Patent
Shaffer et al.

(10) Patent No.: US 8,548,156 B2
(45) Date of Patent: Oct. 1, 2013

(54) METHOD AND SYSTEM FOR BLOCKING LOWER PRIORITY COMMUNICATIONS FOR IMPROVED AUTOMATIC CALL DISTRIBUTION

(75) Inventors: Shmuel Shaffer, Palo Alto, CA (US); Joseph F. Khouri, San Jose, CA (US); Gebran G. Chahrouri, Menlo Park, CA (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1201 days.

(21) Appl. No.: 11/173,605

(22) Filed: Jul. 1, 2005

(65) Prior Publication Data
US 2007/0025544 A1    Feb. 1, 2007

(51) Int. Cl.
*H04M 3/00* (2006.01)
*H04M 5/00* (2006.01)

(52) U.S. Cl.
USPC ............ 379/265.02; 379/265.01; 379/265.05; 379/265.13; 379/266.02

(58) Field of Classification Search
USPC ................... 379/265, 265.01–266.1
See application file for complete search history.

(56) References Cited

U.S. PATENT DOCUMENTS

| | | | | |
|---|---|---|---|---|
| 5,274,700 | A | * | 12/1993 | Gechter et al. ........... 379/211.01 |
| 5,625,682 | A | * | 4/1997 | Gray et al. ............... 379/207.16 |
| 5,999,617 | A | * | 12/1999 | Oyanagi et al. ............ 379/265.1 |
| 6,044,146 | A | * | 3/2000 | Gisby et al. ............... 379/266.02 |
| 6,614,902 | B1 | | 9/2003 | Rizzetto .................... 379/265.11 |
| 6,614,903 | B1 | | 9/2003 | Flockhart et al. ........ 379/265.12 |
| 6,690,664 | B1 | | 2/2004 | Khuc et al. .................... 370/352 |
| 6,735,299 | B2 | | 5/2004 | Krimstock et al. ....... 379/265.11 |
| 6,775,378 | B1 | * | 8/2004 | Villena et al. ............ 379/266.07 |
| 6,879,683 | B1 | | 4/2005 | Fain et al. ................ 379/265.02 |
| 6,904,143 | B1 | | 6/2005 | Peterson et al. ......... 379/265.01 |
| 2003/0002654 | A1 | * | 1/2003 | Torba ....................... 379/266.08 |
| 2004/0028211 | A1 | * | 2/2004 | Culp et al. ............... 379/265.01 |
| 2004/0071281 | A1 | * | 4/2004 | Rashid ..................... 379/210.02 |
| 2004/0114611 | A1 | * | 6/2004 | O'Connell et al. ........... 370/401 |

* cited by examiner

*Primary Examiner* — Khai N Nguyen
(74) *Attorney, Agent, or Firm* — Baker Botts L.L.P.

(57) ABSTRACT

A method for automatic call distribution includes receiving an incoming call for distribution through an automatic call distributor and identifying an agent to handle the incoming call. The method includes transitioning the agent to a transition state to reserve the agent for handling the incoming call. The transition state prevents the agent from participating in a lower priority call.

29 Claims, 2 Drawing Sheets

METHOD AND SYSTEM FOR BLOCKING LOWER PRIORITY COMMUNICATIONS FOR IMPROVED AUTOMATIC CALL DISTRIBUTION

TECHNICAL FIELD OF THE INVENTION

This invention relates in general to communication systems and, more particularly, to a method and system for blocking lower priority communications for improved automatic call distribution.

BACKGROUND OF THE INVENTION

Automatic call distributors (ACDs) are specialized systems designed to match incoming requests for service, for example a telephone call or an e-mail, with a resource that is able to provide that service, for example a human call center agent. ACDs generally perform one or more of the following functions: (i) recognize and answer incoming calls; (ii) review database(s) for instructions on what to do with a particular call; (iii) using these instructions, identify an appropriate agent and queue the call, often times providing a pre-recorded message; and (iv) connect the call to an agent as soon as the agent is available.

Agents in call centers utilizing ACDs receive incoming customer calls routed to them by the ACD, or they place call center related calls to customers. In either case, whenever an agent is engaged in a call center call, the ACD system marks him as being in a "talking" state. Once the agent is identified to be in a talking state, the ACD system will not transfer any new ACD calls to the agent. Agents are expected to be available for ACD or call center incoming and outgoing calls when they are "on the job."

"Informal" call centers employ agents for many tasks other than call center activities. Usually the incoming call load into an informal call center is low, and agents may have greater freedom to use their phones. A problem may arise when an available agent receives or initiates a personal or other low priority call while a customer-related ACD call is being routed to the agent. Such personal calls are generally handled by a call manager or other network server. If the low priority call is an incoming call, for example, the system experiences a critical race between the low priority call being handled by the call manager and the ACD call being handled by the ACD. If the ACD transfer completes first, the low priority caller hears a busy signal or is forwarded to a voicemail system. If the lower priority call completes first, however, the ACD call fails. As a result, a customer who was previously notified that the ACD call was being transferred to the next available agent may be returned to the queue. Accordingly, the level of service provided to customers may be reduced and customer satisfaction adversely impacted.

Additionally, because the call center or ACD system may automatically transfer the agent to a "not ready state" when an ACD call is withdrawn from the agent, the state or availability of the agent may be incorrectly identified to the ACD system. Where historical records of an agent's handling of calls are maintained, the historical record associated with the agent receiving a withdrawn ACD call may erroneously identify the agent as unresponsive.

SUMMARY OF THE INVENTION

The present invention provides a method and system for automatic call distribution that substantially eliminates or reduces at least some of the disadvantages and problems associated with previous methods and systems.

In accordance with a particular embodiment of the present invention, a method for automatic call distribution includes receiving an incoming call for distribution through an automatic call distributor and identifying an agent to handle the incoming call. The method includes transitioning the agent to a transition state to reserve the agent for handling the incoming call. The transition state prevents the agent from participating in a lower priority call.

The method may include receiving the lower priority call that is identified for delivery to the agent and blocking the lower priority call to prevent the delivery of the lower priority call to an endpoint associated with the agent. Blocking the lower priority call may comprise transferring the lower priority call to a voicemail system. The method may include receiving the lower priority call at a call manager operable to deliver the lower priority call to the agent, accessing presence information associated with the agent to determine the availability of the agent for handling the lower priority call and blocking the lower priority call in response to determining that the agent is in the transition state. The method may include detecting the initiation of the lower priority call by the agent and blocking the lower priority call to prevent the completion of the lower priority call by the agent. Detecting the initiation of the lower priority call by the agent may comprise detecting that the agent has initiated a communication session through an endpoint associated with the agent. Blocking the lower priority call may comprise disabling the endpoint, transferring the lower priority call to an IVR port and/or notifying the agent that the lower priority call cannot be completed at this time.

In accordance with another embodiment, an automatic call distribution system includes a processor operable to receive an incoming call and identify an agent to handle the incoming call and a presence server coupled to the processor and operable to transition the agent to a transition state to reserve the agent for handling the incoming call. The transition state prevents the agent from participating in a lower priority call. The automatic call distribution system may include a call manager in communication with the automatic call distributor and operable to receive the lower priority call that is identified for delivery to the agent, determine that the agent is in the transition state and block the lower priority call to prevent the delivery of the lower priority call to an endpoint associated with the agent.

Technical advantages of particular embodiments of the present invention include the use of a transition state to reserve an agent for the handling of an incoming ACD call. The transition state may be automatically implemented when the agent is identified to handle a particular incoming call or when the call center experiences a spike in customer calls. In particular embodiments, the transition state may be recognized by components of a communication system. As a result, components of the communication system may selectively block lower priority calls that might jeopardize the transfer, completion, and handling of a business call. Because more ACD distributed calls may be successfully completed, agent availability and productivity may be increased. Additionally, time and labor expenses may be saved as agents identified for handling business related calls are prevented from unknowingly jeopardizing the handling of an ACD call. As a result, agents who are otherwise responsive to handling ACD calls may not be mistakenly identified as failing to handle an ACD call in favor of a lower priority call. In addition, the transition state can reduce the problems associated with the critical race between the ACD call about to be distributed and a low priority call arriving from a PSTN or initiated by the agent.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
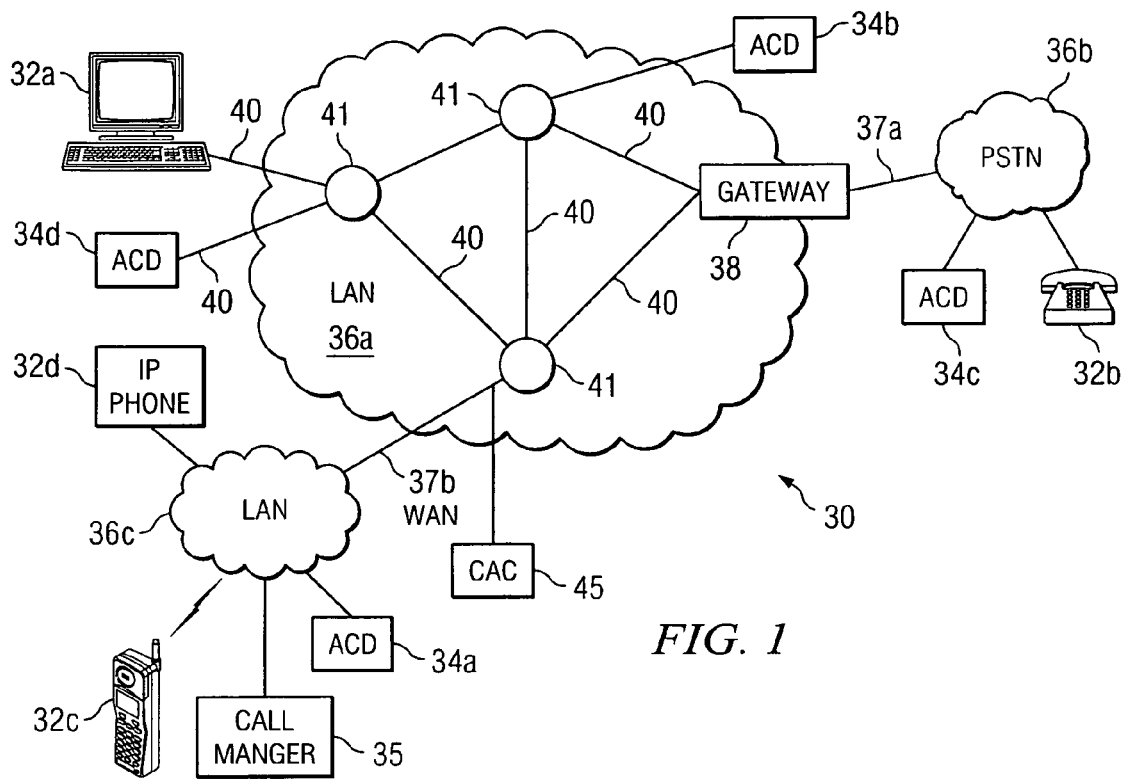
FIG. 1 illustrates a communication system including a plurality of endpoints operable to communicate among each other and a plurality of automatic call distributors, in accordance with a particular embodiment of the present invention.

FIG. 1 illustrates a communication system 30 including a plurality of endpoints 32a-32d having the ability to establish communication sessions between each other and/or automatic call distributors (ACDs) 34a-34d, using one or more of communication networks 36a-36c. ACDs 34a-34d are specialized communication systems designed to route incoming calls to available agents, so that calls are properly and/or evenly distributed. For the purposes of this specification, "automatic call distributor" or "ACD" shall refer to any combination of hardware, software and/or embedded logic which is operable to automatically distribute incoming calls, and "calls" shall include requests for service transmitted using any audio and/or video means, including signals, data or messages transmitted through voice devices, text chat, web sessions, facsimile, instant messaging and e-mail. ACDs 34a-34d may include call centers that receive incoming customer calls for distribution to agents and that place calls from agents to customers.

In the illustrated embodiment, incoming customer calls are routed to an ACD 34 of a communication system 30. The calls are queued until the calls can be distributed to agents in states, such as a "ready state," that render the agents able to service the ACD 34. While an ACD-distributed call is awaiting service in the queue and while any pre-transfer actions are taken by the ACD 34, the caller of the ACD-distributed call usually hears music on hold (MoH) or is presented with a self service option. When an agent is identified as available, the caller is notified that the call is being transferred to the available agent, and the transfer is initiated. However, at times an agent may receive or initiate a low priority, non-business or non-ACD related call while the transfer is in process. Such a call is typically handled by a call manager 35. The teachings of the present invention provide a system and method for blocking these lower priority non-ACD calls for the improved distribution of business related calls. Specifically, the ACD 34 and call manager 35 cooperate to initiate and recognize a "busy pending incoming ACD call" state so that the incoming ACD call may be prioritized over the low priority, non-business call. As a result, the lower priority call may be rerouted or terminated and the ACD related call may be distributed to the available agent.

Call manager 35 includes any combination of hardware, software, and/or encoded logic that operates to receive and process calls to facilitate communication among agents and other users of system 30. In particular embodiments, call manager 35 may act as a private branch exchange (PBX) by supporting Internet Protocol (IP) PBX functions, such as hold, park, transfer, redirect, and/or other high level and low level call management features. For the processing of calls, call manager 35 maintains information on the agents and other users of system 30. For example, call manager 35 may maintain a listing, table, or other organization of information about agents of system 30. The information may include a name or other identifier for each agent. The information may also include contact information such as phone numbers and email addresses for the agents.

When a business-related call is received by call manager 35, call manager 35 and an ACD, such as ACD 34a, cooperate to receive, process, and distribute the business call. For example, call manager 35 and/or ACD 34a may identify one or more agents that are available to receive the business call. As will be described in ore detail below, the identification of the available agents may include the consideration of information maintained by call manager 35. Additionally or alternatively, the identification of the available agents may include the consideration of presence information maintained by ACD 34a or another network device of system 30. The presence information may include the whereabouts of the agents and/or their status with respect to ACD 34a and communication system 30.

Upon identification of an available agent, the business call may be transferred to the available agent. The transfer of the call typically includes the performance of any pre-transfer activities and ultimately the distribution of the call by ACD 34a to the identified agent. As will be described in more detail below with regard to FIG. 2, an agent identified for the distribution of the call may be placed in a "busy pending incoming ACD call" state during performance of any pre-transfer activities and during the physical distribution of the call. The "busy pending incoming ACD call" state reserves the identified agent such that the agent is prevented from receiving or initiating low priority, non-business calls while the ACD-distributed call is transferred to the available agent over communication networks 36a-36c.

In the illustrated embodiment, communication network 36a is a local area network (LAN) that enables communication between a plurality of endpoints 32a-32d and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoints 32c and 32d, ACD 34a and call manager 35 with communication network 36a. Accordingly, users of endpoints 32a-32d and ACDs 34a-34d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor and manage the amount of bandwidth available over WAN 37b.

Communication network 36a includes a plurality of segments 40 and nodes 41 that couple endpoint 32a with ACDs 34b and 34d, gateway 38, and communication networks 36b-36c. Therefore, a user of endpoint 32a is provided with access to endpoints 32b-32d, and ACDs 34a-34d. Nodes 41 may include any combination of network components, gatekeepers, call managers, telephony servers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or ACDs 34a-34d.

In a particular embodiment, communication network 36a employs voice communication protocols that allow for the addressing or identification of endpoints, nodes, and/or ACDs coupled to communication network 36a. For example, using IP, each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VOIP), or simply Voice over Packet (VoP). In the illustrated embodiment, endpoint 32d, ACDs 34a-34b, call manager 35, and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, wired or wireless devices, hand held personal digital assistants (PDAs), or any other device capable of performing telephony functions over an IP network.

In particular embodiments, communication system 30 may receive and transmit data in a session initiation protocol (SIP) environment. SIP is an application-layer control protocol that includes primitives for establishing, modifying, and terminating communication sessions. SIP works independently of underlying transport protocols and without dependency on the type of session that is being established. SIP also transparently supports name mapping and redirection services, which support personal mobility.

It will be recognized by those of ordinary skill in the art that endpoints 32a-32d, ACDs 34a-34d, call manager 35, and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software, and/or encoded logic that supports the communication of packets of media (or frames) using communication network 36a. Endpoints 32a-32d may also include unattended or automated systems, gateways, other intermediate components, or other devices that can establish media sessions. Although FIG. 1 illustrates a particular number and configuration of endpoints, ACDs, segments, nodes, call managers, and gateways, communication system 30 contemplates any number or arrangement of such components for communicating media.

Figure 2:
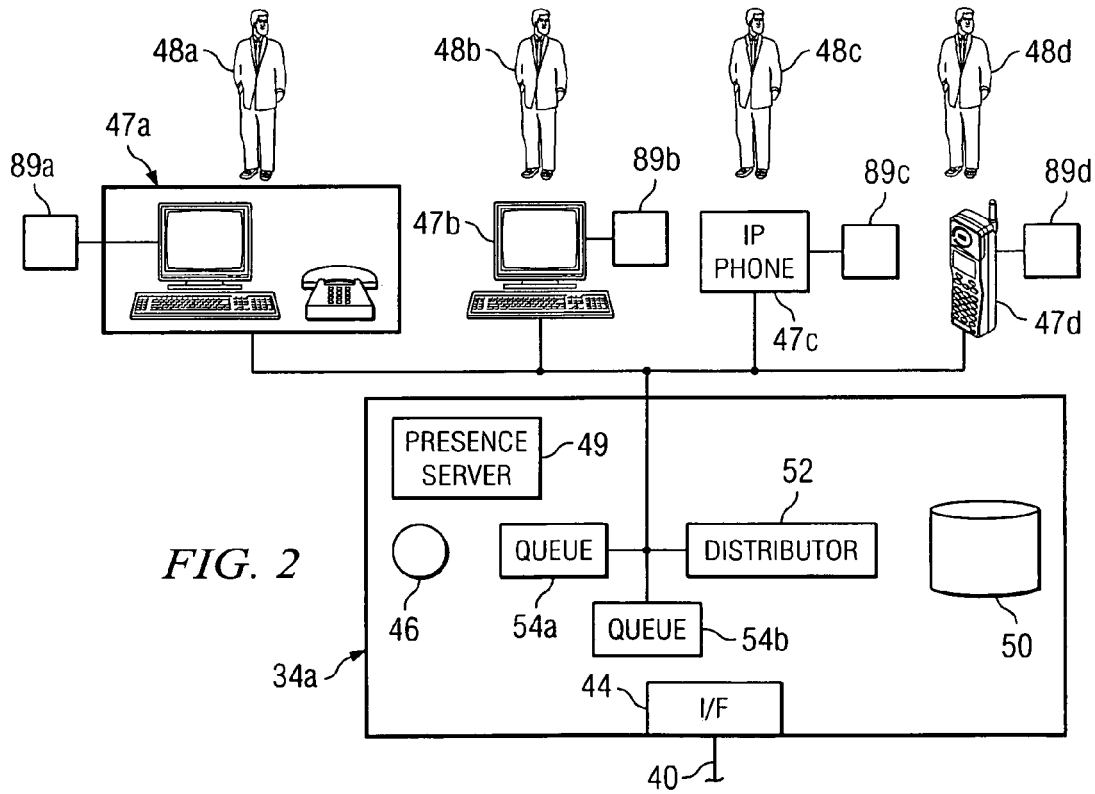
FIG. 2 illustrates an automatic call distributor of FIG. 1 in more detail, illustrating aspects of the present invention.

FIG. 2 illustrates ACD 34a in more detail, in accordance with a particular embodiment of the present invention. ACD 34a includes an interface or input ports 44 which couple ACD 34a with communication network 36a, using segment 40. When a call is received for processing by ACD 34a, a processor 46 may be used to determine which of a plurality of agents 48a-48d should receive the call using endpoints 47a-47d, respectively. As will be described in more detail below, the identification of the available agent may be made by considering the presence information relating to the availability of agents 48a-48d with respect to ACD 34a and communication system 30. Additionally or alternatively, the identification of the available agent may be made by considering agent information maintained by call manager 35 of communication system 30.

In particular embodiments, processor 46 may use presence server 49, a memory lookup, a database, or other memory module, such as memory module 50 to identify available agents 48. Memory module 50 may be any form of volatile or non-volatile memory including, without limitation, magnetic media, optical media, random access memory (RAM), read-only memory (ROM), removable media, or any other suitable local or remote memory component. Processor 46 may be a microprocessor, controller, or any other suitable computing device, resource, or combination of hardware, software, and/ or encoded logic that allows processor 46 to access memory module 50 and identify agents 48a-48d that may be available to receive incoming calls.

Presence server 49 may be any combination of hardware, software and/or encoded logic, and is used to monitor the presence of an agent 48 at an endpoint 47. Presence server 49 may include a single computer or a group of computers that are capable of detecting the presence of an agent 48 at an endpoint 47 in association with one or more of presence clients 89*a*-89*d* at the agent's endpoint, for example, at the agent's PC, phone, PDA, or any other presence client device (e.g., presence clients 89*a*-89*d*). Examples of presence servers include presence servers as defined by IETF specifications.

ACD 34*a* uses processor 46 and presence server 49 to monitor conditions of ACD 34*a*, such as the number, type or characteristics of calls in queues 54 or the "state" of each agent 48. Agents 48 may be placed in various states, such as a "ready" state, a "not ready" state and a "talking" state, according to their current status with respect to the ACD. For example, an agent 48 in a "ready" state may be ready and able to accept an incoming call distributed by ACD 34*a*. Conversely, an agent 48 in a "not ready" state may be away from his desk or otherwise not ready to accept an incoming call, and an agent in a talking state may be communicating on a previously established ACD-related or customer-related call.

In particular embodiments, an agent 48 manually transfers himself from one state to another state. Accordingly, endpoints 47 may include a soft-key or other interface from which the end user can manually transition himself between any supported agent states. For example, an agent 48 may transfer himself from a "ready" state to a "not ready" state by pressing an appropriate key or button on the agent's endpoint 47. In other embodiments, presence server 49 may automatically transition an agent 48 between states based on a characteristic of an incoming call or incoming caller, a characteristic of the agent 48, or a characteristic of an established call or caller. For example, presence server 49 may automatically transition the agent 48 to a "talking" state when the agent 48 answers an incoming ACD-related call. As another example, presence server 49 may automatically transition an agent 48 from a "ready" state to a "not ready" state when the agent 48 begins using a non-ACD associated endpoint, such as the agent's personal cell phone.

In still other embodiments, the transitioning of an agent 48 between states may include a combination of manually implemented and automatically implemented transitions. Accordingly, and as described above, presence server 49 may automatically transition an agent 48 to a "talking" state when agent 48 answers an incoming ACD-related call. When the agent 48 performs other non-ACD related tasks, however, the agent may manually transition himself to a "not ready" state by pressing a soft-key on the agent's phone. As another example, if an agent 48 in a "ready" state receives an incoming ACD-related call but does not answer that call, the agent 48 may be automatically transitioned to a "not-ready" state.

When an incoming ACD call is received by processor 46, processor 46 uses state information provided by presence server 49 to determine if a suitable agent 48 is available to receive the ACD call and, thus, is in a "ready" state. If no agents 48 are available to take the ACD call, the ACD call may be placed into a queue 54 in order to wait for an available agent 48. In the illustrated embodiment, ACD 34*a* has two queues 54*a* and 54*b*; however other embodiments of the present invention may have none, one, or more than two queues 54. The selection of which queue 54 receives an incoming ACD call may depend on the type of customer making the call, the type of service requested in the call, or any other characteristic or condition relating to the call or ACD 34*a*. While a customer is waiting in queue 54 for an agent 48, ACD 34*a* may perform one or more of several functions including data collection from the customer, playing of pre-recorded messages, or other automated process. For example, a pre-recorded message may be played requesting the customer to hold for the next available agent 48.

In particular embodiments, when an agent 48 is identified to receive the incoming ACD call, presence server 49 may automatically transition the identified agent 48 from a "ready" state to a "busy, pending incoming ACD call." ACD 34*a* and other network devices, such as call manager 35 may then recognize the identified agent 48 as being in the process of receiving an ACD-distributed call. As a result, communication system 30 may handle other network communications in a manner that does not jeopardize the transfer and completion of the ACD call. For example, call manager 35 may block any lower priority calls that are initiated by or received for the identified agent 48. Such lower priority calls may be, for example, personal, private or otherwise non-business or non-customer-related calls. In some cases, an outgoing business call made by the identified agent 48 may be characterized as a lower priority call. As discussed below, the treatment of agents in a "busy, pending incoming ACD call" state with respect to receipt of incoming, lower priority calls may vary in different embodiments. For example, in some cases the "busy, pending incoming ACD call" state may be kept, handled or otherwise controlled in a call manager, ACD or other distributed component of a communication system.

In particular embodiments, ACD 34*a* may generate a block calls request that identifies the particular agent 48 to receive the incoming call. The block calls request may be communicated to call manager 35 and may request that call manager 35 block all incoming, lower priority calls received for the identified agent 48. Additionally or alternatively, the block calls request may request that call manager 35 block all outgoing, lower priority calls initiated by the identified agent 48. In response to receiving the block calls request, call manager 35 may generate a confirmation that is communicated to ACD 34*a*. The confirmation may confirm to ACD 34*a* that subsequent communications associated with the identified agent 48 will be handled by call manager 35 in a manner that does not jeopardize the transfer and completion of the ACD call.

In other embodiments, call manager 35 may access presence information stored in presence server 49 of ACD 34*a* to determine the state of an agent 48 before handling any communication associated with agent 48. For example, and as described above, ACD 34*a* may automatically transfer an agent 48 from a "ready" state to a "busy, pending incoming ACD call" state when the agent 48 is identified to receive an incoming or queued ACD call. If call manager 35 subsequently receives an incoming, lower priority call for delivery to the identified agent 48, call manager 35 may access presence server 49 to determine the status of the identified agent 48 with respect to ACD 34*a*. Where the presence information indicates that the identified agent is in the "busy, pending incoming ACD call" state, call manager 35 may block the completion of the incoming, lower priority call.

The actions required of call manager 35 to block a lower priority call may vary depending upon the particular embodiment and the type of lower priority call. In particular embodiments, the actions required of call manager 35 to block a lower priority call may depend on whether the lower priority call is incoming (i.e., identified for delivery to the identified agent 48) or outgoing (i.e., initiated by the identified agent 48 for delivery to another agent 48 or a party outside of communication system 30). For example, the blocking of an incoming, lower priority call by call manager 35 may include disconnection of the incoming, lower priority call. As another example, the blocking of an incoming, lower priority call may include the redirection of the call to a voicemail system or, where appropriate, to another agent 48.

With regard to outgoing, lower priority calls, blocking may include the automated disablement of an endpoint 47 associated with the identified agent 48. Thus, when an agent 48 in a "busy, pending incoming ACD call" state picks up the handset of the agent's telephone to make an outgoing call, the agent 48 may not hear a dial tone. As a result, the agent 48 may be precluded from making the outgoing, lower priority call. In other embodiments, call manager 35 may identify the telephone number dialed by the agent 48 as being a non-customer number. Call manager 35 may then disconnect the call and notify the agent 48 that the call is not permitted at this time. For example, call manager 35 may transfer the call to an IVR port and play a message to the agent 48 that requests that the agent 48 refrain from placing outgoing calls during peak ACD calls. In still other embodiments, the agent 48 identified to receive an incoming ACD call may hear a message that requests agent 48 to hang-up the phone if agent 48 tries to make a lower priority call while the ACD call is being transferred to agent 48.

Regardless of the actions necessary to block the lower priority call, a call in any of the above scenarios may be considered "blocked" since, in the case of an incoming call, the call is not transferred to the identified agent 48 and, in the case of an outgoing call, the call is not allowed to be completed. In either scenario, the identified agent 48 remains available to receive the ACD call. Furthermore, where call manager 35 independently determines the state of the identified agent 48 prior to the disposition of an incoming or outgoing call associated with the identified agent 48, such an embodiment obviates the need for a block call request and any responsive communications between call manager 35 and ACD 34a.

The duration of the "busy, pending incoming ACD call" state and, thus, the duration of the blocking of lower priority calls by call manager 35 may also vary depending upon the particular embodiment. Ideally, when all pre-transfer activities are completed and the ACD call is successfully transferred to the identified agent 48 by distributor 52, presence server 49 may automatically transfer the identified agent 48 into a "talking" state. The transferring of the ACD call to the identified agent by distributor 52 may include, for example, connecting a caller of the ACD call with the identified agent 48 if the call comprises a voice call or forwarding the ACD call to the identified agent 48 if the ACD call comprises, for example, an e-mail. Following the successful distribution of the ACD call to the identified agent 48, ACD 34a and call manager 35 may handle lower priority and business related calls in the normal manner. Typically, both ACD and non-ACD calls that are identified for delivery to the agent 48 in the "talking" state are routed to a voicemail system while the identified agent 48 is on an ACD call.

In particular embodiments, call manager 35 and ACD 34a may also recognize the "busy, pending incoming ACD call" state as a transition state with an automatic expiration. For example, if for some reason the particular ACD call being transferred to the identified agent 48 is not successfully transferred or completed, presence server 49 may automatically transfer the agent 48 to a "ready" state after a predetermined amount of time has passed. Thus, the "busy, pending incoming ACD call" state may have a defined expiration. Because the identified agent 48 is automatically transferred to the "ready" state after the expiration of the "busy, pending incoming ACD call" state, the identified agent 48 may then be able to receive other incoming ACD calls and to receive and initiate lower priority calls. The automated expiration of the "busy, pending incoming ACD call" state ensures that non-ACD calls are not blocked indefinitely when an ACD call is not transferred to the identified agent 48. Example situations in which an ACD call may fail to be successfully transferred include when the ACD caller hangs up, ACD 34 crashes, a code bug exists in the ACD software or there is packet loss in the network.

Although the automated expiration of the "busy, pending incoming ACD call" state is described as being monitored by ACD 34a through the use of presence server 49, it is generally recognized that the duration of the blocking of calls may alternatively be implemented by call manager 35. Accordingly, call manager 35 may include logic or other software that monitors the duration of a call block implemented for an identified agent 48 and that automatically terminates the call block after a predetermined amount of time has passed. In still other embodiments, the expiration of the "busy, pending incoming ACD call" state may be an automated parameter that is automatically implemented by call manager 35.

Furthermore, although the expiration of the "busy, pending incoming ACD call" state may be automatic, as described above, it is recognized that, in particular embodiments, ACD 34a may generate an unblock calls request that is communicated to call manager 35. In contrast to the block calls request described above, the unblock calls request may request that call manager 35 cease the blocking of any incoming or outgoing lower priority calls associated with the identified agent 48. In response to receiving the unblock calls request, call manager 35 may generate a confirmation that is communicated to ACD 34a. The confirmation may confirm to ACD 34a that subsequent communications associated with the identified agent 48 will be routed to the identified agent 48 in the usual manner.

In particular embodiments, call manager 35 may recognize and execute exceptions to the blocking of calls prior to the expiration of the "busy, pending incoming ACD call" state. For example, call manager 35 may recognize and allow emergency calls. Stated differently, call manager 35 may block only non-emergency outgoing calls. Accordingly, if an agent in the "busy, pending incoming ACD call" state attempts to make an outgoing call to any number other than 911 or another recognized emergency related number, call manager 35 may disconnect or otherwise not allow the completion of the call by the agent 48. Other numbers may also be recognized by call manager 35 as exceptions to the call block rule. For example, an agent 48 in the "busy, pending incoming ACD call" state may be allowed to call numbers associated with the agent's managers or supervisors. As a result, agents 48 may not be prevented from consulting with managers or supervisors as part of normal call center operations.

The above described implementations of the "busy, pending incoming ACD call" state may also be used when ACD 34a experiences a spike or other unexpected increase in incoming calls. Thus, an agent 48 may be placed in the "busy pending income ACD call" state before the agent 48 is actually identified to handle a particular ACD call. For example, when the number of incoming ACD calls exceeds the number of agents 48 that are available to receive ACD calls, the backlog of calls in queues 54 may dramatically increase. Accordingly, processor 46 or another component of ACD 34a may continuously monitor the number of calls in queues 54 and/or a level of service provided by ACD 34a. For example, ACD 34a may monitor the amount of time that a call remains in a queue 54 before it is distributed to an available agent 48. Additionally or alternatively, ACD 34a may monitor a percentage or number of agents 48 that are currently on ACD calls or available to take ACD calls in relation to the number of incoming ACD calls or the number of calls in queues 54. Other suitable service related characteristics, such as the length of time it takes to handle an incoming call, may also be monitored to determine the level of service provided by ACD 34*a*.

In particular embodiments, when the number of calls in queues 54 exceeds a threshold value or when a service level problem is detected, ACD 34*a* may transition agents 48 in a ready state to a "busy, pending incoming ACD call" state. As a result, all agents potentially able to handle incoming ACD calls may be prevented from initiating or receiving lower priority calls that may jeopardize the successful transfer of incoming, ACD calls. In particular embodiments, an agent 48 that is transferred into the "busy, pending incoming ACD call" state may be notified of this transition. For example, an endpoint 47 associated with the agent 48 may be used to display a message or other indicator to the agent 48 that identifies the transition of state to the agent 48. The agent 48 may then ready himself to handle an ACD distributed call.

In any of the above described examples, it is recognized that ACD 34*a* may track and keep records of an agent's handling of ACD calls. For example, when an agent 48 is identified as available and is identified for handling a particular ACD call but then fails handle the ACD call, a record of this activity may be made by ACD 34*a*. This record may then be provided to managers and supervisors of the agent 48 on a real-time or historical basis. The record may be used to make decisions about the staffing of the call center, the ACD's ability to meet service level requirements, the response time(s) of a particular agent or group of agents, the offering of promotions or other benefits, and other ACD related business decisions. The historical reports of such data may also be used for forecasting workforce planning.

The recognition of the "busy, pending incoming ACD call" state and the implementation of a call block by call manager 35 prevents inaccurate or misrepresentative record keeping on behalf of ACD 34*a*. In systems not recognizing such a transition state, an agent 48 identified to receive an ACD call might make or receive a lower priority call since the agent 48 may not have any knowledge of the incoming ACD call being transferred to the agent 48. However, where call manager 35 recognizes the "busy, pending incoming ACD call" state and implements a call block on all lower priority calls, agent 48 may be prevented from making such calls and, thus, may more effectively complete ACD calls. Furthermore, because the completion of ACD calls is not jeopardized by the receipt or initiation of lower priority calls, an agent's record of ACD call handling may more accurately reflect the agent's efforts.

It will be recognized by those of ordinary skill in the art that ACD 34*a* may include any number of processors or memory modules to accomplish the functionality and features described herein. The processors 46, memory modules 50, and/or presence server 49 associated with ACD 34*a* may be centrally located (local) with respect to one another, or distributed throughout communication network 36*a*.

Figure 3:
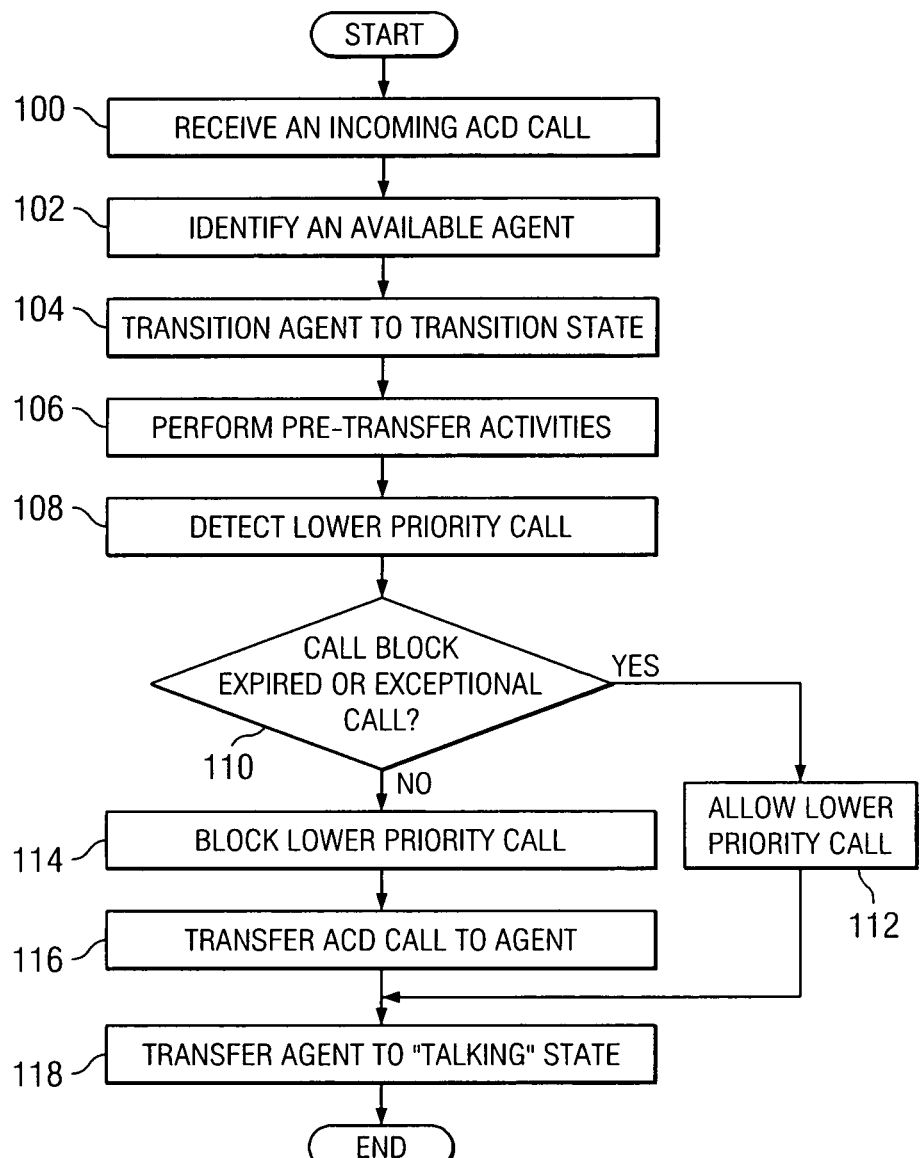
FIG. 3 illustrates a method for automatic call distribution, in accordance with an embodiment of the present invention.

FIG. 3 is a flowchart illustrating a method for automatic call distribution, in accordance with a particular embodiment. The method begins at step 100 where an incoming call is received for distribution through an ACD system 34. In particular embodiments, the call may be received by a call manager 35 of communication system 30. The call manager 35 may determine that the call is business related and should be transferred to ACD 34 for handling.

At step 102, an available agent is identified for handling the incoming call. In particular embodiments, the identification of the agent may be made by ACD 34. ACD 34 may consider presence information maintained by ACD 34 to determine the availability of a plurality of agents with respect to ACD 34. For example, ACD 34 may identify one or more agents in a "ready" state and select one of the available agents for handling the particular incoming call.

At step 104, a presence server 49 associated with ACD 34 may transition the identified agent to a "busy, pending incoming ACD call" state. In particular embodiments, call manager 35, ACD 34, and other network devices of communication system 30 may recognize that an agent in the "busy, pending incoming ACD call" state has been identified for handling an incoming ACD call. Accordingly, any pre-transfer activities may be performed at step 106 without jeopardizing the successful transfer and completion of the ACD call. Specifically, call manager 35, ACD 34 and/or other network devices of communication system 30 may prevent the agent from participating in a lower priority call while the incoming call is transferred to the identified agent. In particular embodiments, the transition to a "busy, pending incoming ACD call" state may be undertaken in response to the transmission of a "block calls request" from the ACD to a call manager.

At step 108, a lower priority call that is associated with the identified agent is detected by call manager 35. In particular embodiments, the lower priority call may be detected when an incoming, lower priority call is received and is identified for delivery to the agent in the "busy, pending incoming ACD call" state. When such an incoming, lower priority call is detected, call manager 35 may operate to block the lower priority call to prevent the delivery of the lower priority call to the identified agent. For example, call manager 35 may transfer the incoming, lower priority call to a voice mail system rather than deliver the incoming, lower priority call to the identified agent.

Additionally or alternatively, a lower priority call may be detected when call manager 35 detects the initiation of an outgoing, lower priority call by the identified agent. When such an outgoing, lower priority call is detected, call manager 35 may operate to block the lower priority call by preventing the completion of the call by the identified agent. For example, call manager 35 may block the lower priority call by disabling an endpoint 32 used by the agent to initiate the outgoing, lower priority call. As another example, call manager 35 may block the outgoing, lower priority call by transferring the call to an IVR port and notifying the agent that the call cannot be completed at this time.

Upon detecting the lower priority call, call manager 35 may determine whether the lower priority call is an exceptional call and/or whether the call block has expired at step 110. The former situation may occur where an outgoing, lower priority call comprises an emergency call, a call to a manager or supervisor, or another permitted call. The latter situation may occur where the "busy, pending incoming ACD call" state has a finite duration and has automatically expired. If either situation has occurred, the lower priority call may be allowed (i.e., transferred to the identified agent, in the case of an incoming call, or completed, in the case of an outgoing call) at step 112. However, if it is determined at step 110 that the lower priority call is not an exceptional call and that the call block has not expired, the lower priority call may be blocked using any of the methods described above at step 114.

The method may then continue to step 116 where the ACD call is transferred to the identified agent. Upon the successful completion of the transfer of the ACD call, the agent may be transitioned from the "busy, pending incoming ACD call" state to a "talking" state to identify to elements of communication system 30 that the agent is currently handling an ACD call.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments of the present invention include the use of a transition state to reserve an agent for the handling of an incoming ACD call. The transition state may be automatically implemented when the agent is identified to handle a particular incoming call or when the call center experiences a spike in customer calls. In particular embodiments, the transition state may be recognized by components of a communication system. As a result, components of the communication system may selectively block lower priority calls that might jeopardize the transfer, completion, and handling of a business call. Because more ACD distributed calls may be successfully completed, agent availability and productivity may be increased. Additionally, time and labor expenses may be saved as agents identified for handling business related calls are prevented from unknowingly jeopardizing the handling of an ACD call. As a result, agents who are otherwise responsive to handling ACD calls may not be mistakenly identified as failing to handle an ACD call in favor of a lower priority call. In addition, the transition state can reduce the problems associated with the critical race between the ACD call about to be distributed and a low priority call arriving from a PSTN or initiated by the agent.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and automatic contact distributor 34a, these elements may be combined, rearranged or positioned in order to accommodate particular routing architectures or needs. In addition, any of these elements may be provided as separate external components to communication system 30, automatic contact distributor 34a or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A computer-implemented method for automatic call distribution executable on a processor, comprising:
   receiving an incoming call for distribution through an automatic call distributor;
   identifying an agent to handle the incoming call, the identified agent in a ready state;
   transitioning the agent from the ready state to a transition state for remaining in the transition state irrespective of a lapsed time while in the transition state to reserve the agent for handling the incoming call, the transition state preventing the agent from participating in, prior to receiving the incoming call for handling, a new lower priority call attempted after the agent is identified to handle the incoming call, the transition state covering a time between when the agent is identified to handle the incoming call and when the incoming call is transferred to the agent;
   receiving the lower priority call that is associated with the agent;
   blocking the lower priority call to prevent the handling of the lower priority call by the agent; and
   upon transferring the incoming call to the agent, transitioning the agent to a talking state.

2. The method of claim 1, wherein:
   identifying an agent to handle the incoming call comprises identifying an available agent in a ready state to handle the incoming call;
   receiving the lower priority call that is associated with the agent comprises receiving the lower priority call after the agent is transitioned to the transition state and before the incoming call is distributed through the automatic call distributor to the identified agent; and
   blocking the lower priority call comprises transferring the lower priority call to a voicemail system associated with the agent.

3. The method of claim 1, further comprising:
   receiving the lower priority call at a call manager operable to deliver the lower priority call to the agent;
   accessing presence information associated with the agent to determine the availability of the agent for handling the lower priority call; and
   blocking the lower priority call in response to determining that the agent is in the transition state.

4. The method of claim 1, wherein the lower priority call is initiated by the agent.

5. The method of claim 4, further comprising detecting that the agent has initiated a communication session through an endpoint associated with the agent; and wherein blocking the lower priority call comprises disabling the endpoint.

6. The method of claim 4, wherein blocking the lower priority call comprises transferring the lower priority call to an IVR port.

7. The method of claim 4, wherein blocking the lower priority call comprises notifying the agent that the lower priority call cannot be completed at this time.

8. The method of claim 1, wherein transitioning the agent to the transition state to reserve the agent for handling the incoming call comprises transmitting a block calls request from the automatic call distributor to a call manager such that the call manager blocks any incoming or outgoing lower priority calls to prevent the agent from participating in the incoming or outgoing lower priority calls.

9. The method of claim 8, further comprising receiving a confirmation, from the call manager, at the automatic call distributor in response to the block calls request.

10. The method of claim 1, further comprising:
    determining that a predefined amount of time has passed since the agent was transitioned into the transition state;
    determining that the incoming call was not successfully transferred to the agent; and
    automatically transferring the agent into a ready state.

11. The method of claim 1, further comprising:
    detecting the initiation of the lower priority call by the agent;
    determining that the lower priority call comprises an emergency call; and
    completing the lower priority call.

12. The method of claim 1, further comprising:
    detecting the initiation of the lower priority call by the agent;
    determining that the lower priority call comprises a business related call to a manager or supervisor of the agent; and
    completing the lower priority call.

13. An automatic call distribution system, comprising:
an automatic call distributor comprising:
a processor operable to receive an incoming call and identify an agent to handle the incoming call, the identified agent in a ready state;
a presence server coupled to the processor and operable to transition the agent from the ready state to a transition state for remaining in the transition state irrespective of a lapsed time while in the transition state to reserve the agent for handling the incoming call, the transition state preventing the agent from participating in, prior to receiving the incoming call for handling, a new lower priority call attempted after the agent is identified to handle the incoming call, the transition state covering a time between when the agent is identified to handle the incoming call and when the incoming call is transferred to the agent; and
a call manager in communication with the automatic call distributor operable to:
receive the lower priority call that is associated with the agent;
determine that the agent is in the transition state; and
block the lower priority call to prevent the handling of the lower priority call by the agent;
wherein, upon the incoming call being transferred to the agent, the presence server is further operable to transition the agent to a talking state.

14. The system of claim 13, wherein the call manager is operable to:
identify an agent to handle the incoming call by identifying an available agent in a ready state to handle the incoming call;
receive the lower priority call that is associated with the agent receiving the lower priority call after the agent is transitioned to the transition state and before the incoming call is distributed through the automatic call distributor to the identified agent; and
block the lower priority call by transferring the lower priority call to a voicemail system associated with the agent.

15. The system of claim 13, wherein:
the call manager is operable to determine that the agent is in the transition state by accessing information stored in the presence server; and
the call manager is operable to block the lower priority call in response to determining that the agent is in the transition state.

16. The system of claim 13, wherein the lower priority call is initiated by the agent.

17. The system of claim 16, wherein:
the call manager is operable to detect the initiation of the lower priority call by the agent by detecting that the agent has initiated a communication session through an endpoint associated with the agent; and
the call manager is operable to block the lower priority call by disabling the endpoint.

18. The system of claim 16, wherein the call manager is operable to block the lower priority call by transferring the lower priority call to an IVR port.

19. The system of claim 16, wherein the call manager is operable to block the lower priority call by notifying the agent that the lower priority call cannot be completed at this time.

20. The system of claim 13, wherein the processor is operable to transition the agent to the transition state to reserve the agent for handling the incoming call by transmitting a block calls request from the automatic call distributor to a call manager, the call manager operable to block the lower priority call by blocking any incoming or outgoing lower priority calls to prevent the agent from participating in the incoming or outgoing lower priority calls.

21. The system of claim 20, wherein the call manager is further operable to communicate a confirmation to the automatic call distributor in response to the block calls request.

22. The system of claim 13, wherein:
the processor is further operable to:
determine that a predefined amount of time has passed since the agent was transitioned into the transition state; and
determine that the incoming call was not successfully transferred to the agent; and
the presence server is further operable to automatically transfer the agent into a ready state.

23. The system of claim 13, wherein a call manager in communication with the automatic call distributor is operable to:
detect the initiation of the lower priority call by the agent;
determine that the lower priority call comprises an emergency call; and
complete the lower priority call.

24. The system of claim 13, wherein a call manager in communication with the automatic call distributor is operable to:
detect the initiation of the lower priority call by the agent;
determine that the lower priority call comprises a business related call to a manager or supervisor of the agent; and
complete the lower priority call.

25. An automatic call distribution system, comprising:
means for receiving an incoming call for distribution through an automatic call distributor;
means for identifying an agent to handle the incoming call, the identified agent in a ready state;
means for transitioning the agent from the ready state to a transition state for remaining in the transition state irrespective of a lapsed time while in the transition state to reserve the agent for handling the incoming call, the transition state preventing the agent from participating in, prior to receiving the incoming call for handling, a new lower priority call attempted after the agent is identified to handle the incoming call the transition state covering a time between when the agent is identified to handle the incoming call and when the incoming call is transferred to the agent;
means for detecting the lower priority call that is associated with the agent;
means for blocking the lower priority call to prevent the handling of the lower priority call by the agent; and
means for, upon transferring the incoming call to the agent, transitioning the agent to a talking state.

26. Logic embodied in a non-transitory computer readable medium, the computer readable medium comprising code that, when executed on a processor, is operable to:
receive an incoming call for distribution through an automatic call distributor;
indentify an agent to handle the incoming call, the identified agent in a ready state;
transition the agent from the ready state to a transition state for remaining in the transition state irrespective of a lapsed time while in the transition state to reserve the agent for handling the incoming call, the transition state preventing the agent from participating in, prior to receiving the incoming call for handling, a new lower priority call attempted after the agent is identified to handle the incoming call the transition state covering a time between when the agent is identified to handle the incoming call and when the incoming call is transferred to the agent;
detect the lower priority call that is associated with the agent;
block the lower priority call to prevent the handling of the lower priority call by the agent; and
upon transferring the incoming call to the agent, transition the agent to a talking state.

27. A computer-implemented method for automatic call distribution executable on a processor, comprising:
receiving an incoming call for distribution through an automatic call distributor;
identifying an agent to handle the incoming call, the identified agent in a ready state;
transitioning the agent from the ready state to a transition state for remaining in the transition state irrespective of a lapsed time while in the transition state to reserve the agent for handling the incoming call, the transition state covering a time between when the agent is identified to handle the incoming call and when the incoming call is transferred to the agent the transition state further preventing the agent from participating in, prior to receiving the incoming call for handling, a new lower priority call attempted after the agent is identified to handle the incoming call;
receiving the lower priority call that is associated with the agent;
blocking the lower priority call to prevent the handling of the lower priority call by the agent;
wherein the agent is transitioned to the transition state before the agent is identified to handle the incoming call, the agent transitioned in response to determining that a queue storing a plurality of incoming calls has exceeded a threshold value; and
upon transferring the incoming call to the agent, transitioning the agent to a talking state.

28. An automatic call distribution system, comprising:
an automatic call distributor comprising:
a processor operable to receive an incoming call and identify an agent to handle the incoming call, the identified agent in a ready state;
a presence server coupled to the processor and operable to transition the agent from the ready state to a transition state for remaining in the transition state irrespective of a lapsed time while in the transition state to reserve the agent for handling the incoming call, the transition state covering a time between when the agent is identified to handle the incoming call and when the incoming call is transferred to the agent, the transition state preventing the agent from participating in, prior to receiving the incoming call for handling, a new lower priority call attempted after the agent is identified to handle the incoming call;
a call manager in communication with the automatic call distributor operable to:
receive the lower priority call associated with the agent;
determine that the agent is in the transition state; and
block the lower priority call to prevent completion of the lower priority call;
wherein the presence server is operable to:
transition the agent to the transition state before the agent is identified to handle the incoming call, the agent transitioned in response to determining that a queue storing a plurality of incoming calls has exceeded a threshold value; and
upon transferring the incoming call to the agent, transition the agent to a talking state.

29. A computer-implemented method for automatic call distribution executable on a processor, comprising:
receiving an incoming call from a caller for distribution through an automatic call distributor;
identifying an agent in a ready state to handle the incoming call;
notifying the caller that the incoming call is to be transferred to the agent;
initiating the transfer process;
transitioning the agent from the ready state to a transition state for remaining in the transition state irrespective of a lapsed time while in the transition state to reserve the agent for handling the incoming call, the transition state preventing the agent from participating in a lower priority call prior to receiving the incoming call for handling the transition state covering a time associated with the transfer process including a time between when the agent is identified to handle the incoming call and when the incoming call is transferred to the agent;
after transitioning the agent to a transition state and before the incoming call is transferred to the agent, receiving a request for the agent to participate in a new lower priority call, the request received while the transfer process of the incoming call is in progress;
blocking the request for the agent to participate in the new lower priority call, wherein:
if the request for the agent to participate in the new lower priority call is a call directed to the agent, re-routing the new lower priority call; and
if the request for the agent to participate in the new lower priority call is a call from the agent, providing the agent with an indication that the agent will not be able to complete the new lower priority call; and
upon transferring the incoming call to the agent, transitioning the agent to a talking state.

* * * * *